Figure 1:
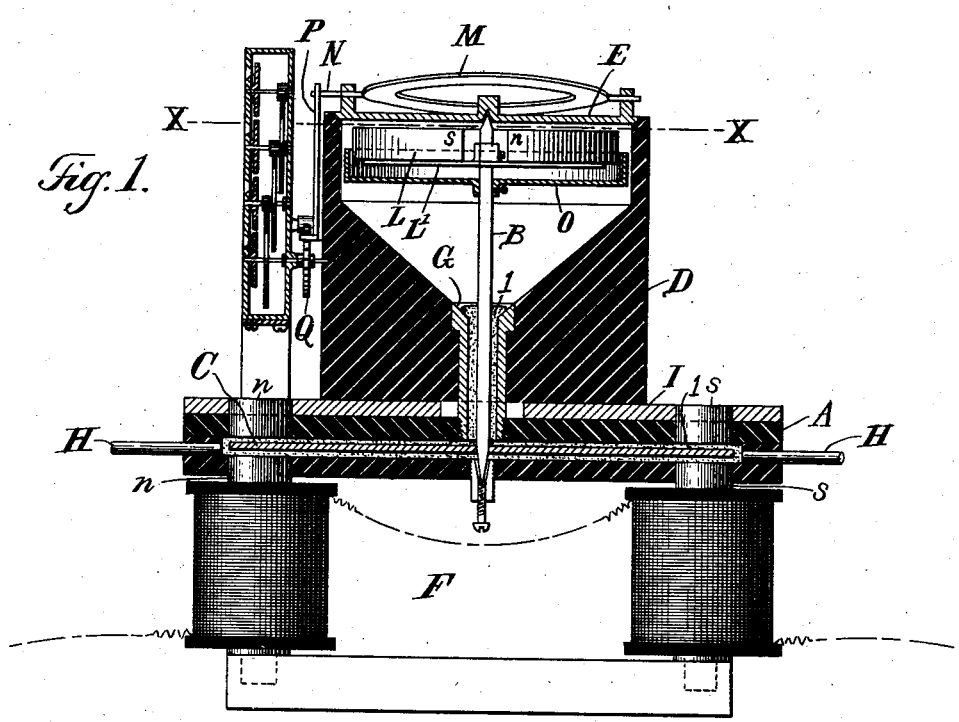

No. 738,902. PATENTED SEPT. 15, 1903.
L. GUTMANN & R. C. LANPHIER.
ELECTRIC METER.
APPLICATION FILED AUG. 26, 1902.
NO MODEL. 2 SHEETS—SHEET 1.

WITNESSES:
A. B. Mattingly
E. L. Lawler

INVENTORS:
Ludwig Gutmann.
Robert C. Lanphier.
BY
H. L. Townsend
ATTORNEY.

No. 738,902. PATENTED SEPT. 15, 1903.
L. GUTMANN & R. C. LANPHIER.
ELECTRIC METER.
APPLICATION FILED AUG. 26, 1902.
NO MODEL. 2 SHEETS—SHEET 2.
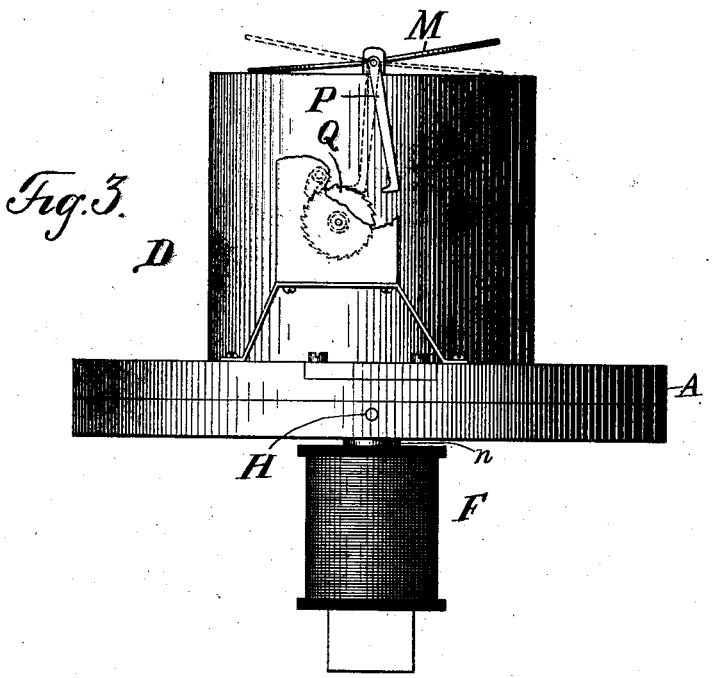
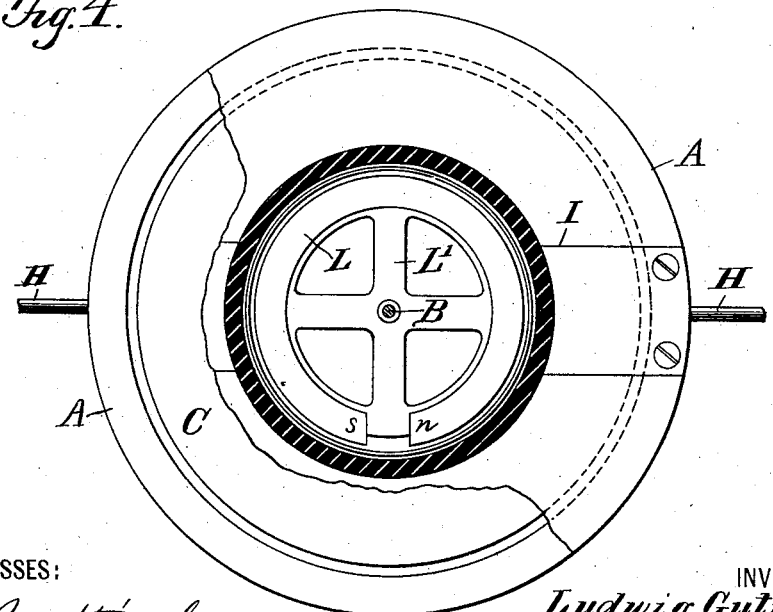
WITNESSES:
A. B. Mattingly
E. L. Lawler
INVENTORS:
Ludwig Gutmann,
Robert C. Lanphier.
BY
ATTORNEY No. 738,902. Patented September 15, 1903.

UNITED STATES PATENT OFFICE.

LUDWIG GUTMANN, OF PEORIA, AND ROBERT C. LANPHIER, OF SPRINGFIELD, ILLINOIS, ASSIGNORS TO SANGAMO ELECTRIC COMPANY, OF SPRINGFIELD, ILLINOIS, A CORPORATION OF ILLINOIS.

ELECTRIC METER.

SPECIFICATION forming part of Letters Patent No. 738,902, dated September 15, 1903.

Application filed August 26, 1902. Serial No. 121,067. (No model.)

*To all whom it may concern:*

Be it known that we, LUDWIG GUTMANN, a resident of Peoria, in the county of Peoria, and ROBERT C. LANPHIER, a resident of Springfield, in the county of Sangamon, State of Illinois, citizens of the United States, have invented certain new and useful Improvements in Electric Meters, of which the following is a specification.

Our invention relates to that type of electric motor wherein the armature is composed of a disk or plate of copper or other good conductor contained in a sealed chamber and rotating in a gap in a magnetic circuit and having current conveyed to and from the disk or plate by means of a conducting liquid, in which said disk is immersed.

Our invention relates more particularly to the means for imparting or transferring motion from the inclosed rotating element of the motor to external devices employed for any purpose—as, for instance, for the purpose of keeping a record or measurement of the rotation of the motor when the same is used for metering electric energy.

Our invention relates, further, to improvements in the construction of that type of motor wherein the rotating armature is inclosed in one space or cavity containing mercury and the elements carried thereby for imparting movement to the external armature or device are contained in another chamber or space devoid of mercury.

Our invention also relates to the means for shielding the magnet which actuates the external devices from the magnetic lines of force in the field-magnet of the motor portion of the device.

The first part of our invention consists, broadly, in a novel method or means of converting the rotary movement of the inclosed armature for the motor into an oscillatory movement of an external device and consists, substantially, in producing by any means a rotating magnetic field rotating synchronously with the inclosed armature and within the sealed space and causing said magnetic field at opposite sides of its path of rotation to operate upon a suitable external armature or armatures mounted upon an external oscillatory or rocking axis.

Our invention consists also in the novel features of construction and combination of devices, as hereinafter more particularly described and then specified in the claims.

Figure 2:
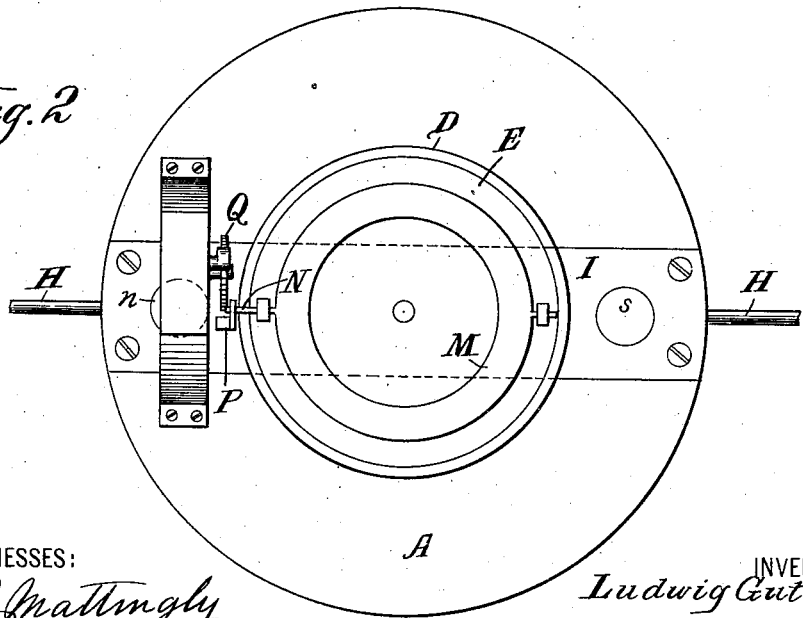

Figure 1 is a vertical section and partial elevation of a device embodying our invention. Fig. 2 is a plan of the same. Fig. 3 is an external end elevation of the device; and Fig. 4 is a horizontal section taken on the line $x\ x$, Fig. 1.

A indicates a suitable box or casing, preferably of circular form, and which may be in one or two parts properly secured together and having a shallow circular chamber within which rotates the disk C, of copper or other good conductor, forming the armature of the motor.

The casing A may be made of insulating material or, if desired, of some non-magnetic conducting material whose inner walls are coated with insulation. The armature C is mounted on a suitable shaft B, which has a lower bearing in the bottom of the case A and an upper bearing in a cover or head E, set into the top of the block D and closing the space which contains the rotary parts of the instrument. The block D, which may also be of insulation, may form a part of casing A, integral therewith or may be fastened thereto by means of a hollow screw G, having a somewhat narrow or restricted passage to receive the shaft B. The mercury or other good conductor (indicated at 1) fills the space in the chamber A and rises to a greater or less extent in the shaft-opening, but sufficiently to balance by its buoying action practically the whole weight of the armature-shaft B and parts sustained by the latter, so as to take the weight of the rotating element off the lower bearing and allow perfectly-free rotation thereof. The shaft-channel connecting the space in the block D and the space in chamber A, in which the disk rotates, should be of restricted size, so that the mercury may not "throw" too violently and quickly against the head E or the parts sustained upon the upper end of the shaft B.

The field-magnet of the motor (indicated at F) may be of any desired type, either a permanent magnet or an electromagnet, but is preferably an electromagnet, and has its two poles $n$ $s$ embedded in the lower wall or floor of chamber A in a suitable manner to make a liquid-tight joint and to be in as close proximity as practicable to the disk C, on one face thereof near the edges, but at opposite sides of the shaft and preferably so as to lie in a diametrical line. The field-magnet F may have its coils connected, as usual in the art, in shunt across the line or circuit whose energy is to be measured when the motor is used as a part of a meter. The current through the armature under the same conditions would be carried to the work whose consumption of energy is to be measured and as well understood in the art.

The terminals which make connection with the body of mercury in which the disk rotates are indicated at H H', and the current passes from one to the other, including the mercury and the disk in series in obvious manner.

At I is indicated an iron plate embedded in or forming a part of the top of casing A and having projections which extend down into close proximity to the upper face of the disk immediately opposite the poles of the magnet F, so that the said disk at its opposite edges in the same diametrical line will rotate in narrow gaps through which the magnetic flux of the single magnetic circuit passes from one pole of field-magnet F to and through the iron plate I back to the opposite pole of said magnet F. This plate or armature I has also an additional function in the organization shown of cutting off the stray magnetic lines of the field-magnet F from the parts to be presently described and which are mounted in the upper chamber and serve by their rotation to impart an oscillatory movement by a magnetic action to external devices. An additional shield, to be presently described, serves to effectually prevent the magnetic field of the motor from retarding or accelerating the speed of the rotating element carried at the top of the shaft.

The preferred form of device whereby the rotary movement of the shaft B is magnetically converted into an oscillatory movement external to the chambers containing the parts will now be described, and it will be assumed that the oscillatory movement thus produced is employed to actuate a counter or register, whereby a record or registry is kept of the movements of the motor.

At or near the top of the shaft B is secured an actuating-magnet, which is preferably a permanent magnet and in its general form may be described as a ring whose continuity is interrupted by a narrow gap, forming a gap between two poles, (marked $n$ $s$, Fig. 4,) which, in effect, constitute the poles of a permanent magnet, the magnetic flux between which serves to provide the magnetic field by whose rotation the external armature is actuated.

The magnet L may be suitably mounted upon a spider or frame L', fastened to the shaft B in any suitable manner, and said magnet is arranged to rotate immediately beneath the head or cover E, which may be of brass or other non-magnetic material. Above the head or cover E is mounted a suitable armature or armatures upon a proper axis, whereby the parts may be given a rocking movement. The preferred form of armature which we employ, as shown at M, consists of a ring-shaped armature or armature of other proper shape such that its magnetic reluctance with respect to the flux from the actuating-magnet L shall not substantially alter, thereby causing it to follow the movement of the actuating-magnet more certain. The rock-shaft to which said armature is suitably secured is indicated at N. The shaft N is mounted in proper bearings on the cover E or on another part of the device. Said actuating-magnet and armature are shielded from the magnetic field of the motor by a shield O, which is located on the shaft B immediately beneath the armature L and secured thereto in any suitable way. Said shield O, which should be of iron or other magnetic material, preferably has upturned edges to more effectually protect the parts above it from the stray lines of force. As will be seen, each whole rotation of the magnetic field at the top of the shaft B will cause one complete to-and-fro movement or rocking of the shaft to which the armature M is secured. Motion may be communicated from said shaft N to a register-train by means of a lever P, fastened thereto and carrying at its lower end a pawl operating upon the prime-wheel Q of the register mechanism in obvious manner, so that each revolution of the magnet L and of the magnetic field between the poles $n$ $s$ thereof will cause the ratchet-wheel Q to move one tooth. Said ratchet-wheel itself is provided with the usual retaining-pawl to prevent backward movement and also, if desired, with devices to positively engage therewith and prevent movement more than one tooth at each actuation by the lever P, while Q moves the meter-train in the usual manner.

We do not limit ourselves to the details of construction shown nor to any particular way of connecting the apparatus to an electric circuit. For instance, instead of leading the total line-current through the meter in the larger sizes but a fraction of the total current passes the meter, so that the main connecting terminals do not lie in the main line, but also form a shunt, like the exciting-magnet. In this case the principal current is led through predetermined shunts, which carry twice, three times, ten times, &c., the current passing the mercury. Further, the electromagnet may be a shunt-magnet only or may have, besides, "series turns" applied, and so be connected as well across the circuit as in series with the line. In this case the series turns may be made to add to the flux of the shunt or to reduce it.

What we claim as our invention is—

1. The combination substantially as described, of an inclosed rotating magnetic field and an external oscillatory or rocking armature actuated by said field positively in both directions.

2. The combination substantially as described with the rotating magnetic field rotating synchronously with the contained parts, of an oscillatory armature external to the casing, and properly mounted upon an axis and in position to be actuated by said magnetic field twice for each revolution of said field, but in opposite directions.

3. The combination substantially as described, of the ring-shaped or circular actuating-magnet having an interrupted continuity, and a rocking ring-shaped armature mounted substantially parallel thereto and having a substantial uniform magnetic reluctance through its whole periphery.

4. In a motor-meter, the combination substantially as described, of an inclosed rotating armature carrying with it a magnet furnishing a rotating magnetic field within a sealed inclosure, and a ring-shaped armature external to said inclosure and mounted upon a rock-shaft transverse to the path of rotation of said magnetic field.

5. The combination with a sealed or inclosed mercury-contact motor and an actuating-magnet having its poles embedded in the casing for the motor, of a shaft carrying a rotating disk or armature, an actuating-magnet mounted on said shaft and a shield carried by the shaft immediately beneath said magnet but in a chamber above the level of the contained liquid or mercury.

6. In a sealed motor having an armature rotating in a conducting liquid, an actuating-magnet mounted on the rotating element above the level of the conducting liquid, and a protective shield in the space above the level of said liquid for protecting said magnet from the stray magnetic field of the motor.

7. In a liquid-contact motor of the sealed type, the combination substantially as described, of a liquid-containing chamber in which the armature rotates, and an actuating-magnet in a separate chamber above the level of the liquid, said chambers being connected by a shaft-channel of restricted size, as and for the purpose described.

8. In a sealed liquid-contact motor-meter, the combination substantially as described, of an actuating-magnet rotating with the contained parts and furnishing a rotating field formed by the magnetic flux passing directly from one pole to the other, and an oscillatory armature mounted externally to the casing and in position to be oscillated by said rotating magnetic field.

9. In an electric motor having an armature rotating in a liquid conductor, a chamber adapted to contain a disk armature, a second chamber, a recording mechanism, an actuating-magnet in said second chamber for imparting movement to the recording mechanism, and a connecting-channel through which the shaft of the motor passes, as and for the purpose described.

10. The combination substantially as described with an inclosed electric motor, of a magnet rotating within the inclosure and having an interrupted continuity, and an exterior rocking armature mounted substantially parallel to said magnet and having a substantially uniform magnetic reluctance through its whole periphery.

11. In a motor-meter, the combination substantially as described, of an inclosed rotating armature carrying with it a magnet furnishing a rotating magnetic field, and an external armature mounted upon a rock-shaft transverse to the path of rotation of said magnetic field.

12. The combination substantially as described, of the motor and a magnet rotating therewith, and an armature actuated by said magnet and having uniform magnetic reluctance.

Signed at Bethlehem, in the county of Northampton and State of Pennsylvania, this 16th day of August, A. D. 1902.

LUDWIG GUTMANN.

Witnesses:
J. STEWART SHICK,
ROBERT S. SIEGEL.

Signed at Springfield, in the county of Sangamon and State of Illinois, this 13th day of August, A. D. 1902.

ROBERT C. LANPHIER.

Witnesses:
F. N. MORGAN,
JACOB BUNN.